United States Patent Office 3,534,251
Patented Oct. 13, 1970

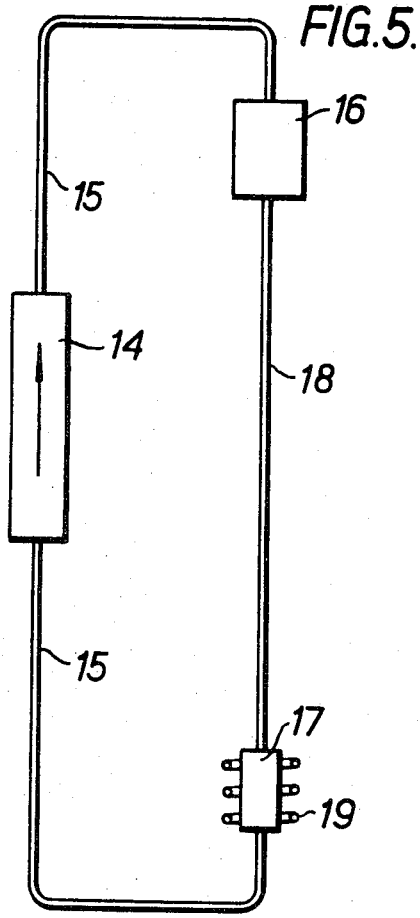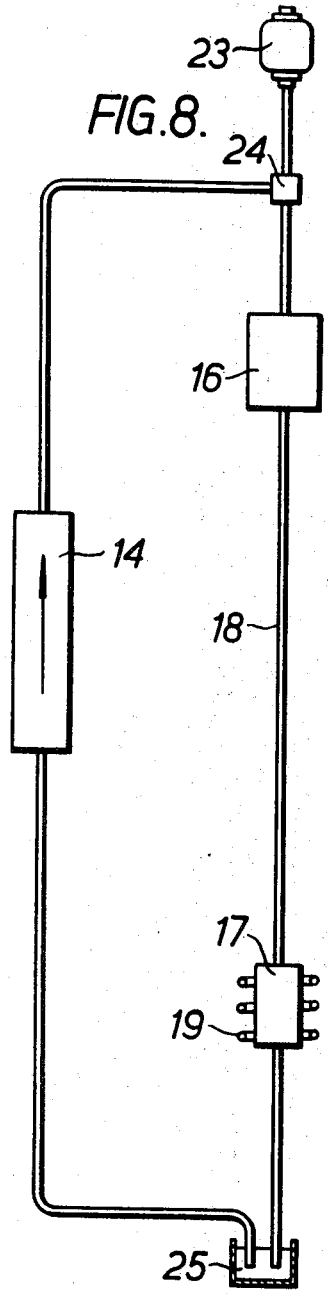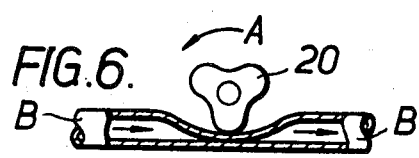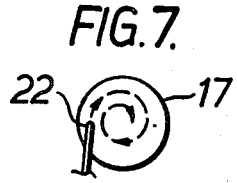

1

3,534,251
SIGNAL-TO-NOISE RATIO ENHANCEMENT
IN A NUCLEAR MAGNETIC RESONANCE
APPARATUS
Rex Edward Richards, Oxford, England, assignor to Perkin-Elmer Limited, a British company
Filed Mar. 12, 1968, Ser. No. 712,485
Int. Cl. G01n 27/78
U.S. Cl. 324—.5                              8 Claims

ABSTRACT OF THE DISCLOSURE

A sample material and a quantity of paramagnetic substance in solution are positioned in a container in a nuclear magnetic resonance apparatus. Means are provided for transporting the sample between a first nuclear magnetic resonance measuring station located in a polarizing magnetic gap and a dynamic nuclear polarizing station positioned outside of and relative to the first station.

---

This invention relates to Nuclear Magnetic Resonance (N.M.R.) spectroscopy and in particular to method of and apparatus for improving the signal-to-noise ratio of the output signal of an N.M.R. spectrometer.

N.M.R. spectroscopy relies on the presence of gyromagnetic nuclei in the sample under analysis. These possess both charge and spin and may therefore be compared to tiny bar magnets spinning about their longitudinal axis.

Gyromagnetic nuclei in a steady magnetic field precess around the axis of the field in permitted orientations or energy levels, and when a state of equilibrium is reached, as a result of a relaxation process in a period of time which varies from nuclei to nuclei and which is called the thermal relaxation time, the nuclei tend to distribute themselves approximately equally in the permitted energy levels. Protons, for example, have only two permitted levels, a low energy state in which they are aligned with the magnetic field and a high energy state in which they are aligned against the field, and the equilibrium populations in the two states are almost identical.

By virtue of the relaxation process, however, a slight preponderance of lower energy nuclei is built up under the influence of the steady magnetic field, and if energy is now supplied in such manner as to tend to level out the preponderance a net absorption of energy should result as nuclei from a lower state are raised to an upper state. This is in fact achieved in N.M.R. spectroscopy and the absorption gives rise to the N.M.R. signal in a suitably arranged receiver coil surrounding a sample positioned in the working gap of a powerful magnet, the energy supplied being RF energy of the proper frequency, in relation to the intensity of the magnetic field in the working gap, to match up the natural precessing frequency of the nuclei at that field (i.e., the Larmor frequency).

The strength of the absorption signal in relation to the noise level increases as the number of nuclei flipping over from lower to upper state increases, and it follows that anything tending to establish a greater population difference at equilibrium will lead to a better signal-to-noise ratio.

Now, increasing values of steady magnetic field will tend to widen the population difference. This and the fact that more energy is required to flip over the nuclei against the stronger field, and that therefore the resulting absorption signal must be stronger, militate in favour of as high a field intensity as can be practically achieved, and the N.M.R. art has in fact moved in this direction: from a working gap flux of a mere 7,000 gauss some years ago, figures close to 100,000 gauss are now within reach.

2

Quite distinct is the improvement in signal-to-noise ratio that can be achieved by Dynamic Nuclear Polarization (D.N.P.) but difficulties arise in its application to N.M.R.

D.N.P. is based on the coupling between the spin relaxations of electrons and nuclei in a sample containing a suitable paramagnetic substance in solution. By exciting resonance in the electrons, it is possible, by virtue of the coupled relaxation, to "pump" the nuclei from one to another state and thus produce an increased population difference, although for reasons that need not be enlarged upon the N.M.R. signal to which said difference gives rise may at times be inverted.

D.N.P. tends to impress upon the nuclei the much wider population difference normally occurring in the spin states of the electrons by virtue of a coupling between electrons and nuclei which may be imagined as a coupling between two spinning bar magnets.

In exciting electron resonance, one might decide on the value of steady magnetic field to be used for D.N.P. and then match up the frequency of the radiation energy required, bearing in mind that if the same steady field is to be used for observing the N.M.R. signal there is everything to be gained, in view of what has been said hereinbefore, from the higher field values up to the limit set by the difficulties in coupling up radiation energy of very small wavelength, i.e., microwave energy. Unfortunately, a limiting field value would soon be reached at which the improvement given by D.N.P. could be approached by simply raising the observation field well above said limiting value.

There is a further important factor that militates against D.N.P. and N.M.R. at the same magnetic field. For reasons that need not be explained, D.N.P. is most efficient at a field value which is well below the maximum that would be set by the present state of the microwave art. As a mere indication, we may say that best efficiency is attained with values ranging from about 3000 gauss (or even significantly below it for electron resonance thereat to require a radiation wavelength significantly greater than that of microwave radiation) to 4000 gauss, which are much too low for observation purposes, because, quite apart from consideration of signal-to-noise ratio, large chemical shifts and simple spectra—which are highly desirable in N.M.R. work—are associated with the higher field intensities.

It is thus clear that any compromise between optimum field requirements for D.N.P. and N.M.R., in so far as signal-to-noise ratio is concerned, is likely to be very unrewarding, and this is the reason why D.N.P. has found no general application in N.M.R. spectroscopy.

The object of the present invention is to provide a method of and apparatus for enabling an N.M.R. signal to be generated with enhanced signal-to-noise ratio by means of D.N.P. in such manner that the improvement resulting from the application of D.N.P. may be optimized without imposing any serious restrictions on the N.M.R. observation field, which may thus be chosen to produce the independent improvement to be expected from the use of higher and higher field intensities.

The present invention is based on the realization that the N.M.R. sample may undergo D.N.P. at a suitably low magnetic field intensity and then be subjected to a suitably high magnetic field intensity in which the N.M.R. signal is observed, and that independent optimization of the two fields is possible. It will thus be clear that a low magnetic field intensity refers to that intensity which is most suitable for D.N.P. and a high magnetic field intensity refers to that intensity which is most practically convenient for N.M.R. having regard to operational requirements and the type of gyromagnetic nuclei involved.

In the context of the present specification, reference to D.N.P. and N.M.R. stations implies the existence thereat of a low magnetic field and a high magnetic field, respectively, each as broadly defined hereinabove.

According to one aspect of the invention there is provided a method of enabling an N.M.R. signal to be generated with enhanced signal-to-noise ratio comprising the steps of causing an N.M.R. sample containing an appropriate quantity of a convenient paramagnetic substance in solution to dwell for a first residence time at a D.N.P. station, transferring the sample during an appropriately brief transit time to an N.M.R. measuring station, generating the N.M.R. signal while the sample is made to dwell for a second residence time at said N.M.R. measuring station, returning the sample to the D.N.P. station and reiterating the cycle during the chosen scan time of the N.M.R. spectrum of the sample or part of said spectrum.

To derive the maximum advantage from D.N.P., the transit time should be brief compared with the relaxation time of the nuclei which have undergone D.N.P.

Different operating conditions may require different residence times, and provision may be included for controlling said residence times and optionally said transit time.

For maximum enhancement of the signal-to-noise ratio, optimum magnetic field intensity for D.N.P. may be chosen independently of an N.M.R. magnetic field intensity, which may be as high as can be practically achieved.

Electrical noise generated in the transference of the sample may be rejected by a gating arrangement, which makes the N.M.R. signal operative only when the sample is at the N.M.R. measuring station (hereinafter referred to, where convenient, as N.M.R. station).

The sample may be caused to spin while the N.M.R. signal is observed, or in addition during its transference, or even the whole time. Spinning of the sample at the N.M.R. station is intended for the purpose of averaging out field inhomogeneities in the working gap of the N.M.R. magnet.

According to a further aspect of the invention there is provided an apparatus for enabling an N.M.R. signal to be generated with enhanced signal-to-noise ratio when said signal is derived from an N.M.R. sample containing an appropriate quantity of a convenient paramagnetic substance, comprising a D.N.P. station adapted to be placed outside the working gap of an N.M.R. magnet in spaced relation to an N.M.R. station adapted to be positioned in the working gap of said magnet, and means for rapidly reciprocating the N.M.R. sample between the two stations, provision being included for determining in either a fixed or adjustable manner the residence time of the sample at each station.

Apart from means for irradiating the sample with radiation at the electron resonance frequency, the D.N.P. station may include magnetic field producing means adapted to cooperate with the fringing field of the N.M.R. magnet so that in operation the sample is not subjected to sharply varying magnetic gradients in its passage from one to other station.

The magnetic field producing means preferably provide a flux homogeneity sufficient to ensure at least reasonable efficiency of the D.N.P. process, bearing in mind that too low a figure is wasteful of radiation power.

The sample may be transferred between stations either by pumping or in a sample holder which is reciprocated pneumatically. In the first alternative, residence times and transit time for a given flow rate may be governed by the relative volume of residence vessels and of a communicating passage therebetween. The volumes may be made adjustable, if desired. In the second alternative, valve means and appropriate control thereof may be provided to determine residence and transit times.

Provision may be included for minimizing shock at either station and for spinning the sample at least during N.M.R. observation.

The apparatus may include an assembly adapted to be positioned by the user between the poles of an N.M.R. magnet in the fashion of an accessory.

The invention will now be described by way of example with reference to the accompanying diagrammatic drawings, wherein:

FIG. 5 depicts an embodiment of sample reciprocating means in which the sample is intended to be circulated in a unidirectional closed circuit;

FIG. 6 is an illustration of the pump shown in FIG. 5;

FIG. 7 is a modification of FIG. 5;

FIG. 8 is a further modification of FIG. 5;

Figure 1:
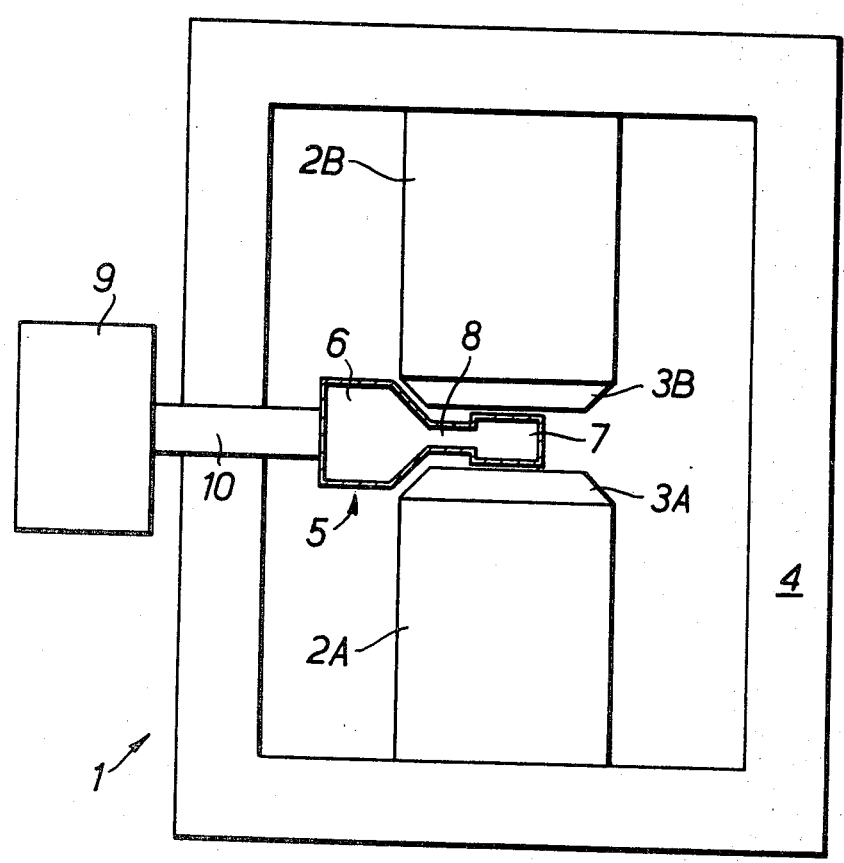
FIG. 1 depicts the magnet system of an N.M.R. spectrometer and the general layout of one embodiment of the invention in relation to the system.

In FIG. 1, the magnet system forming part of an N.M.R. spectrometer is shown at 1. It comprises poles 2A and 2B, terminating at one end in high-permeability pole pieces 3A and 3B, respectively, and connected at the other end to a yoke 4.

The free faces of pole pieces 3A and 3B are accurately machined and assembled to define two parallel planes between which an air gap extends. A small volume of the air gap around the magnetic axis of the poles 2A and 2B is used as the working gap.

The intensity of the magnetic field in the working gap will be assumed to be in excess of 10,000 gauss, and although no energizing windings are shown it is understood that poles 2A and 2B may be regarded as either permanent magnets or electromagnets.

It is well known that high-resolution N.M.R. requires high flux homogeneity in the working gap and we will assume in our case that the homogeneity is of the order of 1 part in $10^8$ and that homogenizing devices, such as the well known Golay coils, may be used to improve upon the figure that can be achieved by careful design, choice of materials and construction.

A housing 5, bounded by a thick line, encloses a D.N.P. station at 6, an N.M.R. measuring station at 7, and an intercommunicating passage at 8.

Although further details will presently be given, it will be sufficient for the present purpose to indicate that the D.N.P. station includes magnetic field producing means cooperating with the fringing field of the magnet system 1 in producing a field of some 3,300 gauss, in addition to a microwave cavity for coupling up microwave energy to the N.M.R. sample, and that the N.M.R. measuring station includes the usual essential means to be found in an N.M.R. probe, such as the coil means for irradiating the sample and picking up the N.M.R. absorption signal.

Within the housing 5 there is also situated the means for rapidly reciprocating the N.M.R. sample between station 6 and station 7. In addition, a microwave energy source is shown at 9 which through a waveguide 10 feeds the microwave cavity at the D.N.P. station 6, at a frequency in the X band as required for exciting electron resonance at the specified field intensity.

With the N.M.R. spectrometer and the D.N.P. station in a state of readiness, a method in accordance with the present invention is carried out by inserting an N.M.R. sample containing a suitable paramagnetic substance at 6, to bring it into operative relationship with the reciprocating means and by operating certain controls which will ensure that the sample after undergoing D.N.P. at 6 for a first residence time of say 1½ seconds is quickly transferred through the intercommunicating passage at 8 in a transit time of, say, ⅒ second to the N.M.R. measuring station at 7, where it is held for a second residence time of, say, .5 second while the N.M.R. signal with enhanced signal-to-noise ratio is generated, the cycle being repeated with a period of observation taking place roughly every two seconds.

It will be appreciated that the residence and transit times can only be approximate. They refer to a sample containing gyromagnetic nuclei under observation which have a relaxation time greater than, say, 1 second.

To avoid passing on to the integrating system of the N.M.R. signal any electric noise generated in the transference of the sample, the amplifier connected to the N.M.R. receiver coil does not respond to the input from the coil other than when the sample is at the N.M.R. station and the resonance spectrum of the sample is being scanned.

An indication of what may be expected in favourable circumstances from the present invention is that with an N.M.R. magnetic field of 14,000 gauss and a D.N.P. field of 3,300 gauss, as stated, the improvement over observation at 14,000 gauss without D.N.P. could be in the region of 50 times. If the N.M.R. magnetic field is increased, the improvement is less marked because the higher observation field is itself conducive to better signal-to-noise ratio in a rather steep manner. At 66,000 gauss, which can be achieved with cryogenic magnets, the invention may be expected to produce an improvement of about 10 times. This is still significant, but the disparity clearly suggests that the invention comes into its own when applied to spectrometers based on conventional magnet systems with a ceiling of around 25,000 gauss, which are, of course, much less expensive and complex than cryogenic systems.

In the present description of practical embodiments of the invention, it is not considered necessary to elaborate in any detail upon the microwave energy source or the wave-guide, since the technique of generating and conveying said energy to a termination such as a resonating cavity is well known in the electronic art generally and the requirements to be met in exciting electron resonance at the D.N.P. station are well known from the Electron Paramagnetic Resonance (EPR) art. It will suffice to say that the cavity may be replaced by a helix or a coil.

Figure 2:
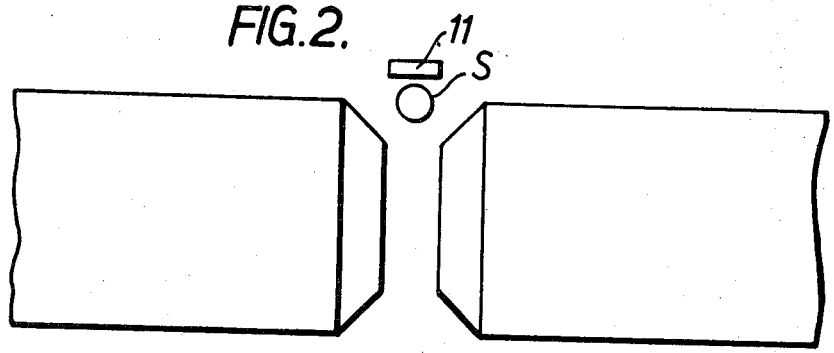
FIG. 2 to FIG. 4 are alternative embodiments of the magnetic field producing means at the D.N.P. station.
Figure 3:
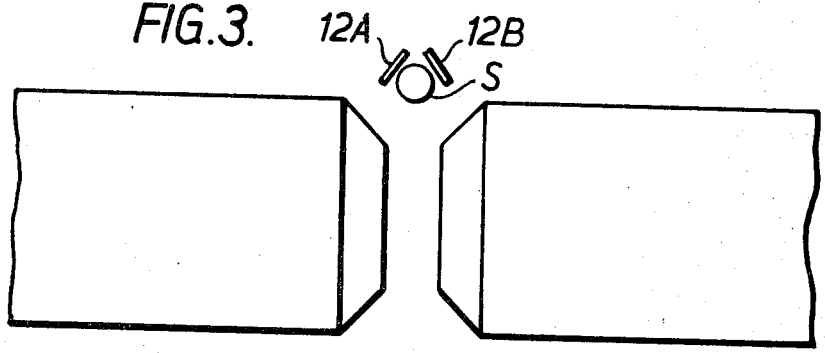
Figure 4:
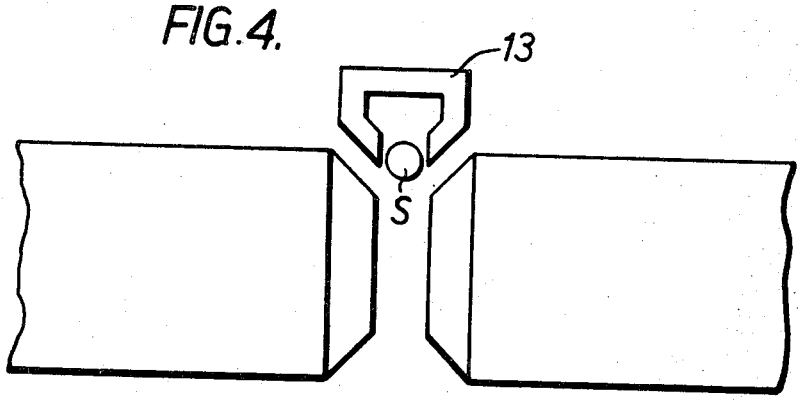

FIGS. 2 to 4 illustrate alternative embodiments of the magnetic field producing means, which in each case is adapted to cooperate with the fringing field of the N.M.R. magnet system shown at 1 in FIG. 1, hereinafter referred to simply as N.M.R. magnet, where convenient to do so.

In FIG. 2, a bar magnet 11 of suitable magnetic strength is positioned so that its lines of force in the sample volume S, i.e., the volume within which the sample will be located at the D.N.P. station, assist the fringing field and provide flux homogeneity of about 1 part in 3000. The bar magnet 11 is made of a platinum alloy.

In FIG. 3, adequate flux homogeneity in the sample volume is produced by means of two coils, 12A and 12B, placed generally as shown, the tilt of the coils being adjusted during assembly to produce best results. When the apparatus is in operation a current of suitable intensity is passed through the coils.

In FIG. 4, a small permanent magnet 13 is positioned where its strength is approximately equal to that of the fringing field of the N.M.R. magnet, so that the field of the latter is not significantly disturbed.

In the foregoing embodiments of the magnetic field producing means for the D.N.P. station, said means are supported on a diamagnetic frame attached to the N.M.R. magnet.

Details will now be given of the manner in which the N.M.R. sample—it will be assumed to be in the liquid state—is alternated between the D.N.P. station and the N.M.R. station.

Where a comparatively large supply of sample is available, unidirectional circulation thereof in a closed circuit becomes particularly attractive In FIG. 5, continuous circulation may be set up in a closed circuit comprising pump 14, piping 15 of circular cross-section, cylindrical D.N.P. residence vessel 16, cylindrical N.M.R. residence vessel 17, and intercommunicating passage 18, when the circuit is filled with sample and the pump 14 is operated.

Vessel 16 is located in the field of any one of the magnetic producing means shown in FIGS. 2 to 4, within the sample volume denoted therein by reference S, in the proper space relationship to a microwave resonator (not shown). Vessel 17 is situated in the working gap of the N.M.R. magnet and is surrounded by the N.M.R. receiver coil 19, which in this embodiment serves as the N.M.R. irradiating coil as well, although two-coil arrangements are quite suitable for the present invention.

The volumes of vessels 16 and 17 and the internal bore of the intercommunicating passage 18 are so chosen that for a given sample flow the appropriate residence times in vessels 16 and 17 and the appropriate transit time in the intercommunicating passage 18 are established, bearing in mind however that the bore of the intercommunicating passage 18 will preferably be proportioned to give the shortest practicable transit time.

To obtain the residence times referred to earlier on in the description of FIG. 1, the cross-sectional areas of the two volumes were in the ratio of 3:1.

In another embodiment (not illustrated) variable volume residence vessels and intercommunicating passage are included to enable independent adjustments of residence times and transit time at a given flow rate.

The construction of pump 14 is shown diagrammatically in FIG. 6, depicting the well-known peristaltic type in which a multilobed rotor 20, rotating in the direction of arrow A, acts on flexible tubing 21 and causes a pinch in said tubing to travel from left to right as each lobe comes into action, liquid flow being thus set up in the direction of arrow B.

FIG. 7 shows a refinement concerning the manner in which the liquid sample is fed into vessel 17 (FIG. 5) and depicts a nozzle 22 through which the liquid under pressure conveyed along intercommunicating passage 18 (FIG. 5) issues in the form of a jet. Nozzle 22 is so positioned that the jet impinges tangentially upon the inner face of vessel 17 so that the liquid in said vessel acquires a swirling motion tending to average out flux inhomogeneities in the working gap of the N.M.R. magnet. The averaging out process is known in the art as sample spinning.

In FIG. 8, sample spinning has been achieved by arranging the part of the circuit comprising vessels 16 and 17 and the intercommunicating passage 18 as a longitudinally extending assembly rotatable by means of motor 23 relative to the remainder of the circuit which is a stationary part, the liquid connection between the two parts of the circuit being made through a rotating gland 24 at one end and a reservoir 25 at the other. The reservoir is shown open to atmosphere in FIG. 8, but it may in fact be made hermetic if desired while still allowing said assembly to rotate through a suitable packing gland.

A modification which is useful in carrying out a method in accordance with the invention consists in providing a sampling valve for the purpose of breaking into the closed circuit and introducing therein a sample of a liquid product so as to monitor the output or any intermediate stage of a processing plant to ensure that the product is up to specification or to check that an experimental product has in fact been improved in the desired manner after certain processing operations have been carried out.

There is no need to describe either the sampling valve or any means for purging the circuit after observation of a sample in readiness for the next sampling since these devices are well known in connection, for example, with gas chromatography.

Although the embodiments of FIGS. 5 to 8 have been described as providing continuous circulation, they can be adapted if desired to intermittent circulation, with discrete volumes of sample being transferred through the intercommunicating passage in the transit time.

Figure 10:
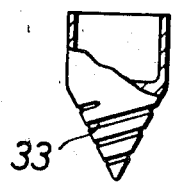
FIG. 10 depicts an embodiment of the cap used for the sample container in the apparatus of FIG. 9.
Figure 11:
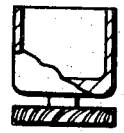
FIG. 11 depicts a further embodiment of the cap used for the sample container in the apparatus of FIG. 9.

In N.M.R. spectroscopy, the amount of liquid sample available is often comparatively small and continuous pumping in a closed circuit becomes unpractical. The embodiments of FIGS. 9 to 11 show the manner in which small samples may be placed in a sample holder and reciprocated pneumatically.

Figure 9:
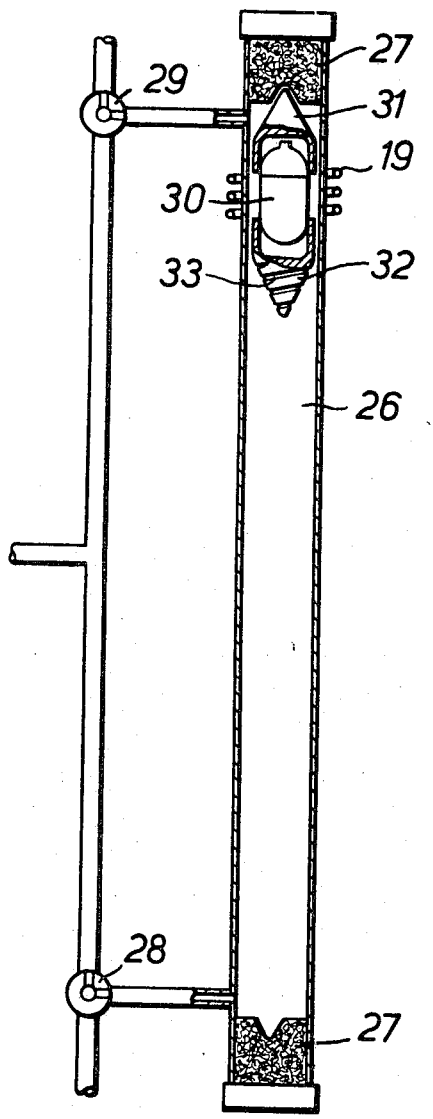
FIG. 9 is an embodiment of sample reciprocating means in which a small quantity of sample in a holder is intended to be moved to and fro between the D.N.P. station and the N.M.R. station.

In FIG. 9, a straight cylindrical duct 26 extends between the D.N.P. and N.M.R. stations illustrated in FIG. 1, if the stations are imagined as reversed. Around the portion of the duct 26 accommodated within the N.M.R. station there is positioned an N.M.R. coil corresponding to coil 19 in FIG. 5. The other end of the duct 26 is accommodated at the D.N.P. station, which does not differ from the D.N.P. station referred to in the description of FIG. 5. Duct 26 is provided with buffers 27 of foam rubber at both ends, whereat connections are made through valves 28 and 29 to a compressed air supply (not shown).

The sample is sealed in an ampoule 30 in frictional engagement with end caps 31 and 32, both of which are conical in shape. Cap 32 has a spiral groove 33 as shown enlarged in FIG. 10, which is partly cross-sectional. The ampoule 30 and the caps 31 and 32 form a kind of "shuttlecock" which is made to reciprocate from one end to the other of the duct 26 by timed operation of solenoid-operated valves 28 and 29 each alternately functioning as inlet and exhaust valve, buffers 27 serving to cushion the shock as the shuttlecock reaches one or other limit of travel and being provided with Teflon (RTM) cups into which the caps 31 and 32 may pivot. Groove 33 (FIG. 10) ensures that the shuttlecock is made to spin by the air that tends to force a passage therethrough, so that the sample reaches the N.M.R. station while it is spinning.

In the present embodiment residence and transient times are established by proper timing of the valves 28 and 29.

In a modification, the valves 28 and 29 are additionally phased to produce an air bearing action.

An alternative form of cap 32 is shown in FIG. 11, wherein the lower part of the cap is shaped in the fashion of a small air turbine. The caps are made of Teflon (RTM).

In a further embodiment, the layout of FIG. 9 is reversed and in a still further embodiment the duct 26 is rifled to assist spinning of the sample.

In another arrangement a number of ampoules filled with sample are mounted on the periphery of a wheel adapted to be indexed round so that each ampoule is transferred from the D.N.P. station to the N.M.R. station.

One of the outstanding advantages of the present invention is that it enables the signal-to-noise ratio of the N.M.R. signal to be enhanced at less complication and cost than by resorting to cryogenic techniques for the production of very high intensities of observation fields, which, moreover, suffers from the disadvantage of being not very well suited to high-resolution work.

In addition, the invention may provide a pulsed N.M.R. output which is very suitable for controlling a well known N.M.R. accessory often referred to as C.A.T. (Computer of Average Transients), which enables the signal-to-noise ratio of the N.M.R. signal to be improved by an averaging process over a number of N.M.R. scans in which the noise tends to average to zero by reason of its random phasing from scan to scan and the signal tends to average to higher and higher values by reason of its repeatable phasing. Thus the invention not only provides a significant improvement in signal-to-noise ratio but it facilitates the use of signal averaging means, such as C.A.T., for obtaining further improvements where scan repeats can be tolerated.

What I claim is:

1. Apparatus for enabling a nuclear magnetic resonance signal to be generated with enhanced signal-to-noise ratio where said signal is derived from a sample containing a quantity of paramagnetic substance comprising:
   a polarizing magnet having a working gap;
   a first station located in the working gap;
   means for causing and measuring nuclear magnetic resonance of a sample substance positioned at said first station;
   a second station located outside said working gap in spaced relation to said first station;
   means for causing dynamic nuclear polarization of said sample at said second station;
   a sample holder containing a quantity of the sample;
   duct means extending between said first and second stations, said duct means defining a path of movement for said sample holder between said stations; and,
   transfer means reciprocating said sample holder through said duct means between said first and second stations and for providing a predetermined sample holder transit time between said first and second stations and a predetermined residence time at each of said first and second stations.

2. Apparatus as claimed in claim 1 wherein said transfer means includes a fluid and means for causing said fluid to exert a transfer force on said sample holder.

3. Apparatus as claimed in claim 2 wherein said fluid comprises a gas.

4. Apparatus as claimed in claim 2 including valve means for controlling residence times.

5. Apparatus as claimed in claim 3 wherein said transfer means includes means for spinning the sample holder.

6. Apparatus as claimed in claim 3 including means positioned at both stations for decelerating the sample rapidly without causing undue shock.

7. Apparatus as claimed in claim 3 wherein said transfer means includes for causing the sample holder to spin while in transit under the influence of a force exerted on said sample by said pneumatic means.

8. Apparatus as claimed in claim 1 wherein said magnet establishes a fringing field near said gap and said means for establishing dynamic nuclear polarization include a magnetic field producing magnet, said latter magnet positioned for providing with the fringing field of said nuclear magnetic resonance magnet a uniformly varying field gradient between said magnets whereby a sample will not be subjected to sharply varying magnetic gradients in its passage from said first to said second station.

References Cited

UNITED STATES PATENTS 3,080,519   3/1963   McCoubrey _____ 324—0.5

OTHER REFERENCES

Grutzediek, Kramer and Muller-Warmuth: Magnetic Double Resonance Spectrometer for Dynamic Nuclear Polarization and Relaxation Time Measurements at 175 G, Rev. of Sci. Instr., 36(10), October 1965, pp. 1418–1422.

RUDOLPH V. ROLINEC, Primary Examiner

M. J. LYNCH, Assistant Examiner

UNITED STATES PATENT OFFICE

CERTIFICATE OF CORRECTION

Patent No. 3,534,251   Issued October 13, 1970

It is certified that error appears in the above-identified patent and that said Letters Patent are hereby corrected as shown below:

At column 8, line 42 (Claim 7), the word --means-- is inserted after the word "includes".

SIGNED AND
SEALED
MAR 9 1971

(SEAL)
Attest:

Edward M. Fletcher, Jr.
Attesting Officer

WILLIAM E. SCHUYLER, JR.
Commissioner of Patents